United States Patent
Cooper et al.

(10) Patent No.: US 7,125,466 B2
(45) Date of Patent: Oct. 24, 2006

(54) METHOD OF PREPARING A MOLDED CROSS VEHICLE BEAM

(75) Inventors: Christopher Cooper, Moon Township, PA (US); Olaf J. Zoellner, Bridgeville, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 450 days.

(21) Appl. No.: 10/737,405

(22) Filed: Dec. 16, 2003

(65) Prior Publication Data

US 2005/0001450 A1 Jan. 6, 2005

Related U.S. Application Data (62) Division of application No. 10/321,321, filed on Dec. 17, 2002, now Pat. No. 6,688,680.

(51) Int. Cl.
*B29C 49/20* (2006.01)
*B29C 49/22* (2006.01)

(52) U.S. Cl. ............ 156/244.14; 264/515; 264/516; 156/245

(58) Field of Classification Search ........... 156/244.14; 264/515, 516
See application file for complete search history.

(56) References Cited

U.S. PATENT DOCUMENTS

| | | | |
|---|---|---|---|
| 5,100,204 A | 3/1992 | Makihara et al. | 297/452 |
| 5,122,325 A | 6/1992 | Bartley et al. | 264/531 |
| 5,190,803 A | 3/1993 | Goldbach et al. | 428/138 |
| 5,354,114 A | 10/1994 | Kelman et al. | 296/192 |
| 5,364,159 A | 11/1994 | Kelman et al. | 296/192 |
| 5,762,395 A | 6/1998 | Merrifield et al. | 296/203 |
| 5,823,602 A | 10/1998 | Kelman et al. | 296/70 |
| 5,934,733 A | 8/1999 | Manwaring | 296/72 |
| 5,934,744 A | 8/1999 | Jergens et al. | 296/192 |
| 5,976,451 A | 11/1999 | Skaja et al. | 264/516 |
| 6,139,082 A | 10/2000 | Davis, Jr. et al. | 296/72 |
| 6,186,885 B1 | 2/2001 | Ahn et al. | 454/121 |
| 6,193,924 B1 * | 2/2001 | Huse | 264/503 |
| 6,196,828 B1 | 3/2001 | Newby, Sr. | 425/522 |
| 6,216,810 B1 | 4/2001 | Nakai et al. | 180/68.4 |

(Continued)

FOREIGN PATENT DOCUMENTS

DE    100 37 374 C1    2/2002

(Continued)

*Primary Examiner*—Suzanne E. McDowell
(74) *Attorney, Agent, or Firm*—Joseph C. Gil (57) ABSTRACT

A method of preparing a molded cross vehicle beam which includes a hollow blow molded thermoplastic rigid member that is integrally attached to a rigid support, e.g., a U-shaped metal plate, and at least one attachment element, is described. The rigid support (12) has a first surface, a second surface and a plurality of perforations having edges. The attachment element(s) (81, 84) have a first surface, a second surface and a plurality of perforations having edges. The attachment element provides a means of attaching the molded cross vehicle beam to a separate structure (e.g., the A-pillars of an automobile). A thermoplastic parison precursor of the hollow rigid thermoplastic member (15) is blow molded against the first surfaces of the rigid support (12) and the attachment element (81, 84). Portions of the thermoplastic parison extend through perforations in each of the rigid support (12) and the attachment element (81, 84), thereby attaching the hollow thermoplastic rigid member (15) to the rigid support (12) and the attachment element (81, 84). The present invention also relates to a process by which the molded cross vehicle beam is prepared.

17 Claims, 9 Drawing Sheets

U.S. PATENT DOCUMENTS

| | | | |
|---|---|---|---|
| 6,273,495 B1 | 8/2001 | Haba et al. | 296/194 |
| 6,378,934 B1 | 4/2002 | Palazzolo et al. | 296/208 |
| 6,421,979 B1 | 7/2002 | Fischer et al. | 52/745.19 |
| 6,644,722 B1 * | 11/2003 | Cooper | 296/187.02 |
| 2002/0145309 A1 | 10/2002 | Shikata et al. | 296/208 |

FOREIGN PATENT DOCUMENTS

| | | |
|---|---|---|
| EP | 976 519 | 2/2000 |
| EP | 1 329 302 | 7/2003 |
| WO | 00/56517 | 9/2000 |

\* cited by examiner

METHOD OF PREPARING A MOLDED CROSS VEHICLE BEAM

CROSS REFERENCE TO RELATED PATENT APPLICATION

The present patent application claims the right of priority under 35 U.S.C. §121 and is a Division of U.S. patent application Ser. No. 10/321,321, filed Dec. 17, 2002, now U.S. Pat. No. 6,688,680 B1.

DESCRIPTION OF THE INVENTION

The present invention relates to a molded cross vehicle beam, which includes a hollow blow molded thermoplastic rigid member that is integrally attached to a rigid support, e.g., a U-shaped metal plate, and at least one attachment element. The attachment element serves as a means of attaching the molded cross vehicle beam to a separate structure, such as the door-pillars of an automobile. A thermoplastic parison precursor of the hollow rigid thermoplastic member is blow molded against the rigid support and the attachment element. Portions of the thermoplastic parison extend through perforations in each of the rigid support and the attachment element, thereby attaching the hollow thermoplastic rigid member to the rigid support and the attachment element. The present invention also relates to a process by which the molded cross vehicle beam is prepared.

The majority of transportation vehicles, such as automobiles, trucks and buses, include a cross vehicle beam, which typically spans laterally across the forward portion of the passenger or operator compartment. In the case of an automobile, the cross vehicle beam (commonly referred to as a cross car beam) is typically located behind the dashboard, and is attached to the door-pillars (A-pillars) of the automobile. The cross vehicle beam, which is typically fabricated from metal, provides rigidity and structural support to the vehicle, e.g., relative to a lateral impact upon the vehicle.

The heating, ventilating and air conditioning (HVAC) system of a vehicle, such as an automobile, is typically located behind the dashboard. Air is transported through the HVAC system generally by means of a plastic conduit. Often, the plastic conduit of the HVAC system is attached to and supported by the cross vehicle beam.

Typically the plastic conduit and the cross vehicle beam are separately fabricated, and then attached together in a separate step. The plastic conduit and cross vehicle beam, e.g., in the form of a metal beam or tube, are typically attached together by means of, for example, fasteners, adhesives, straps and/or brackets. Such attachment methods typically involve a series of manufacturing steps, and the use of additional materials, e.g., rivets, bolts and adhesives. In the case of an automotive application, for example, the separately fabricated cross car beam and plastic conduit, when assembled together, can take up an undesirably large amount of space within the passenger compartment.

In the transportation industries, e.g., the automotive and aircraft industries, it is desirable to minimize the weight of the vehicle or aircraft in an effort towards maximizing fuel efficiency. The total weight of a vehicle or aircraft can be reduced by reducing the weight of its components. However, it is generally required that the strength and rigidity of a component not be compromised as the weight of the component is reduced. It is also desirable in the transportation industries to minimize the space occupied by various components that are incorporated into the vehicle or aircraft.

A need thus exists for the development of cross vehicle beams that include a rigid support and a rigid thermoplastic hollow member attached thereto, that provide a combination of structural stability, reduced weight and compact (or space saving) design. In addition it is desirable that such newly developed cross vehicle beams also include a means for attaching the beam to a separate structure, such as the door-pillars of an automobile. A need also exists with regard to the development of new methods of preparing such molded articles in which the rigid thermoplastic hollow member is concurrently molded and fixedly attached to a rigid support and an attachment element during formation of the cross vehicle beam.

U.S. Pat. No. 5,354,114 discloses an integrated cross car structural duct cluster. The integrated cross car structural duct cluster of the '114 patent is disclosed as including a steel plate that is attached to a molded plastic body of a thermoplastic or thermoset material.

In accordance with the present invention, there is provided a molded cross vehicle beam comprising:

(a) a rigid support having a first surface, a second surface and a plurality of perforations having edges;

(b) at least one attachment element having a first surface, a second surface and a plurality of perforations having edges, said attachment element providing means of attaching said molded cross vehicle beam to a separate structure; and (c) a rigid molded member of thermoplastic material, at least a portion of said rigid molded member being in abutting relationship with the first surface of said rigid support (a) and the first surface of said attachment element (b), said rigid molded member having a hollow interior, wherein said molded cross vehicle beam is prepared by a process comprising blow molding a thermoplastic parison precursor of said rigid molded member (c) onto the first surface of said rigid support (a) and the first surface of said attachment element (b), a portion of the thermoplastic material of said thermoplastic parison extends through at least some of said perforations of said rigid support (a) and said attachment element (b), the edges of said perforations being embedded in the plastic material extending therethrough, thereby fixedly attaching said rigid molded member (c) to said rigid support (a) and said attachment element (b).

In further accordance with the present invention, there is also provided a method of preparing a molded cross vehicle beam comprising a rigid molded hollow thermoplastic member fixedly attached to a rigid support and at least one attachment element, said method comprising:

(I) placing said rigid support and said attachment element in a mold,
  said rigid support having a plurality of perforations having edges, a first surface and a second surface, and
  said attachment element having a plurality of perforations having edges, a first surface and a second surface; and (II) blow molding a thermoplastic parison precursor of said rigid hollow member against the first surface of said rigid support and the first surface of said attachment element;

wherein a portion of the thermoplastic material of said thermoplastic parison extends through at least some of said perforations of said rigid support and said attachment element, the edges of said perforations being embedded in the plastic material extending therethrough, thereby attaching fixedly said rigid hollow member to said rigid support and to said attachment element.

The features that characterize the present invention are pointed out with particularity in the claims, which are annexed to and form a part of this disclosure. These and other features of the invention, its operating advantages and the specific objects obtained by its use will be more fully understood from the following detailed description and accompanying drawings in which preferred embodiments of the invention are illustrated and described.

Unless otherwise indicated, all numbers or expressions, such as those expressing structural dimensions, quantities of ingredients, etc. used in the specification and claims are understood as modified in all instances by the term "about".

In FIGS. 1 through 9, like reference numerals designate the same components and structural features.

DETAILED DESCRIPTION OF THE INVENTION

Figure 1:
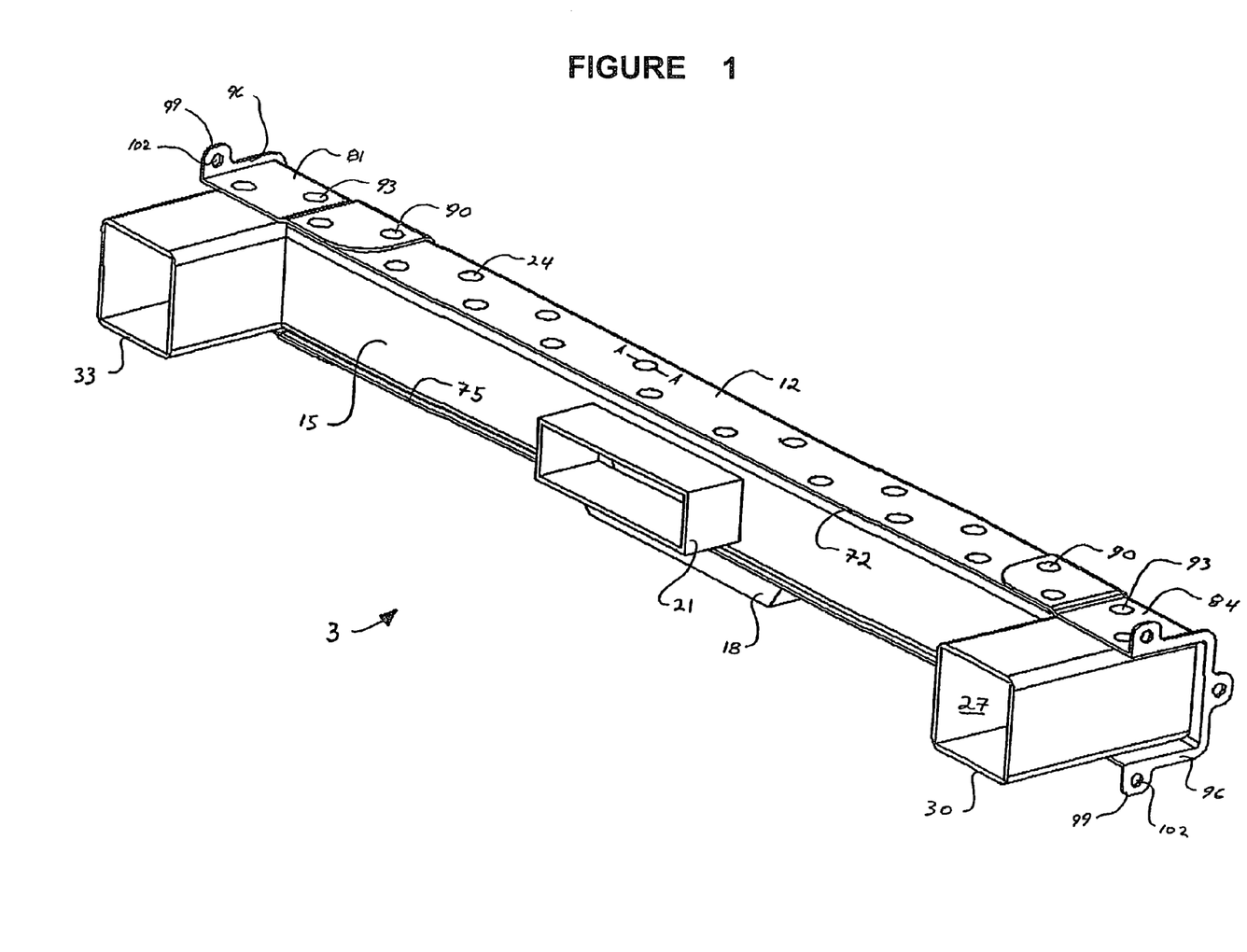
FIG. 1 is a representative perspective view of a molded cross vehicle beam according to the present invention, which includes a blow molded rigid hollow thermoplastic duct 15 that is fixedly attached to a rigid support 12 and to attachment elements 81 and 84.

Referring now to FIG. 1 of the drawings, there is depicted a representative perspective view of a molded composite cross vehicle beam 3 according to the present invention. Cross vehicle beam 3 includes a U-shaped rigid support 12 having a plurality of perforations (not shown), a blow molded rigid, continuous and unitary air duct 15 of thermoplastic material, having a hollow interior 27, and two attachment elements 81 and 84 each having a plurality of perforations (not shown). Rigid hollow duct 15 is attached to rigid support 12 by means of a plurality of attachment heads 24. Rigid hollow duct 15 is also attached to attachment elements 81 and 84 by means of a plurality of attachment heads 93. In addition, rigid hollow duct 15 is attached to rigid support 12 and attachment elements 81 and 84 by means of attachment heads 90 (as will be discussed in further detail herein).

Duct 15 has extensions 18, 21, 30 and 33 which each provide gaseous communication with the interior 27 of duct 15. For example, conditioned air (e.g., heated, cooled or dehumidified air) introduced through extension 21 travels through interior 27 and can exit duct 15 through extensions 18, 30 and 33. Cross vehicle beam 3 can be used as a cross vehicle beam extending between the door-pillars of a vehicle, such as a car or truck, not shown.

The rigid support (a), e.g., rigid support 12 of cross beam 3, and the attachment element (b), e.g., attachment elements 81 and 84, may each independently be fabricated from a material selected from metal, thermoset plastic material, thermoplastic material and combinations thereof. Metals from which rigid support (a) and attachment element (b) may be fabricated include, but are not limited to, aluminum and steel. In a preferred embodiment of the present invention, rigid support 12 and attachment elements 81 and 84 of cross vehicle beam 3 are each fabricated from metal, e.g., steel.

As used herein and in the claims the term "thermoset plastic material" means plastic materials having a three dimensional crosslinked network resulting from the formation of covalent bonds between chemically reactive groups, e.g., active hydrogen groups and free isocyanate groups. Thermoset plastic materials from which rigid support (a) and attachment element (b) may each be independently fabricated include those known to the skilled artisan, e.g., crosslinked polyurethanes, crosslinked polyepoxides and crosslinked polyesters. Of the thermoset plastic materials, crosslinked polyurethanes are preferred. Rigid support 12 and attachment elements 81 and 84 may each independently be fabricated from crosslinked polyurethanes by the art-recognized process of reaction injection molding. Reaction injection molding typically involves, as is known to the skilled artisan, injecting separately, and preferably simultaneously, into a mold: (i) an active hydrogen functional component (e.g., a polyol and/or polyamine); and (ii) an isocyanate functional component (e.g., a diisocyanate such as toluene diisocyanate, and/or dimers and trimers of a diisocyanate such as toluene diisocyanate). The filled mold may optionally be heated to ensure and/or hasten complete reaction of the injected components. Upon complete reaction of the injected components, the mold is opened and the molded article, e.g., rigid support 12, is removed.

As used herein and in the claims, the term "thermoplastic material" means a plastic material that has a softening or melting point, and is substantially free of a three dimensional crosslinked network resulting from the formation of covalent bonds between chemically reactive groups, e.g., active hydrogen groups and free isocyanate groups. Examples of thermoplastic materials from which rigid support (a), e.g., rigid support 12 of cross vehicle beam 3, and attachment element (b), e.g., attachment elements 81 and 84, may each be independently fabricated include, but are not limited to, thermoplastic polyurethane, thermoplastic polyurea, thermoplastic polyimide, thermoplastic polyamide, thermoplastic polyamideimide, thermoplastic polyester, thermoplastic polycarbonate, thermoplastic polysulfone, thermoplastic polyketone, thermoplastic polyethylene, thermoplastic polypropylene, thermoplastic acrylonitrile-butadiene-styrene, thermoplastic polyvinylchloride and mixtures or thermoplastic compositions containing one or more thereof. Of the thermoplastic materials from which rigid support (a) and attachment element (b) may be fabricated, thermoplastic polyamides are preferred. Rigid support 12 and attachment elements 81 and 84 may each be independently fabricated from thermoplastic materials by the art-recognized process of injection molding, in which a molten stream of thermoplastic material, e.g., molten thermoplastic polyamide, is injected into a mold, e.g., an optionally heated mold. Upon cooling the filled mold, the molded article, e.g., rigid support 12, is removed. A preferred thermoplastic material from which rigid support 12 and attachment elements 81 and 84 may each be fabricated is thermoplastic polyamide, e.g., DURETHAN thermoplastic polyamide, commercially available from Bayer Corporation.

The thermoset plastic materials and/or thermoplastic materials from which rigid support (a) and attachment element (b) may each be independently fabricated, may optionally be reinforced with a material selected from glass fibers, carbon fibers, boron fibers, metal fibers, polyamide fibers (e.g., KEVLAR polyamide fibers) and mixtures thereof. The reinforcing fibers, and the glass fibers in particular, may have sizings on their surfaces to improve miscibility and/or adhesion to the plastics into which they are incorporated, as is known to the skilled artisan. Glass fibers are a preferred reinforcing material in the present invention. If used, the reinforcement material, e.g., glass fibers, is typically present in the thermoset plastic materials and/or thermoplastic materials of rigid support (a) and/or attachment element (b) in a reinforcing amount, e.g., in an amount of from 5 percent by weight to 60 percent by weight, based on the total weight of rigid support (a) or attachment element (b).

The thermoplastic material of blow molded rigid hollow member (c), e.g., duct 15, may be selected independently from those examples recited previously herein with regard to rigid support (a) and attachment element (b). In an embodiment of the present invention, the thermoplastic material of blow molded rigid hollow member (c) is selected from at least one of thermoplastic polyolefins (e.g., thermoplastic polyvinylchloride), thermoplastic polyvinylchlorine, thermoplastic polyurethanes, thermoplastic polyureas, thermoplastic polyamides, thermoplastic polyesters and thermoplastic polycarbonates. Thermoplastic polyolefins from which the blow molded rigid hollow member (c) may be fabricated include, for example, thermoplastic polyethylene, thermoplastic polypropylene, thermoplastic copolymers of ethylene and propylene, and thermoplastic polybutylene. In a preferred embodiment of the present invention, blow molded rigid hollow member (c) is fabricated from thermoplastic polyamide (e.g., DURETHAN thermoplastic polyamide), commercially available from Bayer Corporation).

The thermoplastic materials from which blow molded rigid hollow member (c) may be fabricated, may optionally be reinforced with a material selected from glass fibers, carbon fibers, boron fibers, metal fibers, polyamide fibers and mixtures thereof. The reinforcing materials, e.g., glass fibers, may be treated, e.g., sized, as described previously herein with regard to rigid support (a) and attachment element (b). If used, the reinforcement material, e.g., glass fibers, is typically present in the thermoplastic materials of blow molded rigid hollow member (c), e.g., duct 15, in a reinforcing amount, e.g., in an amount of from 5 percent by weight to 60 percent by weight, based on the total weight of blow molded rigid hollow member (c).

The plastic materials of rigid support (a), attachment element (b) and blow molded rigid hollow member (c) may each independently further contain one or more functional additives. Additives that may be present in the plastic material of the rigid support (a), attachment element (b) and/or the blow molded rigid hollow member (c) of the cross vehicle beam include, but are not limited to, antioxidants, colorants, e.g., pigments and/or dyes, mold release agents, fillers, e.g., calcium carbonate, ultraviolet light absorbers, fire retardants and mixtures thereof. Additives may be present in the plastic material of the rigid support, attachment element and/or the blow molded rigid hollow member in functionally sufficient amounts, e.g., in amounts independently from 0.1 percent by weight to 10 percent by weight, based on the total weight of the plastic material of the rigid support, attachment element or the blow molded rigid hollow member.

As used herein and in the claims, the term "rigid" of rigid support (a), attachment element (b) (when it is rigid) and blow molded rigid hollow member (c) generally means that the materials from which these elements are fabricated are self supporting. More specifically, rigid support (a), attachment element (b) (when it is rigid) and blow molded rigid hollow member (c) each typically and independently have a flexural modulus of at least 500 MPa, e.g., from 1000 MPa to 15,000 MPa.

Figure 2:
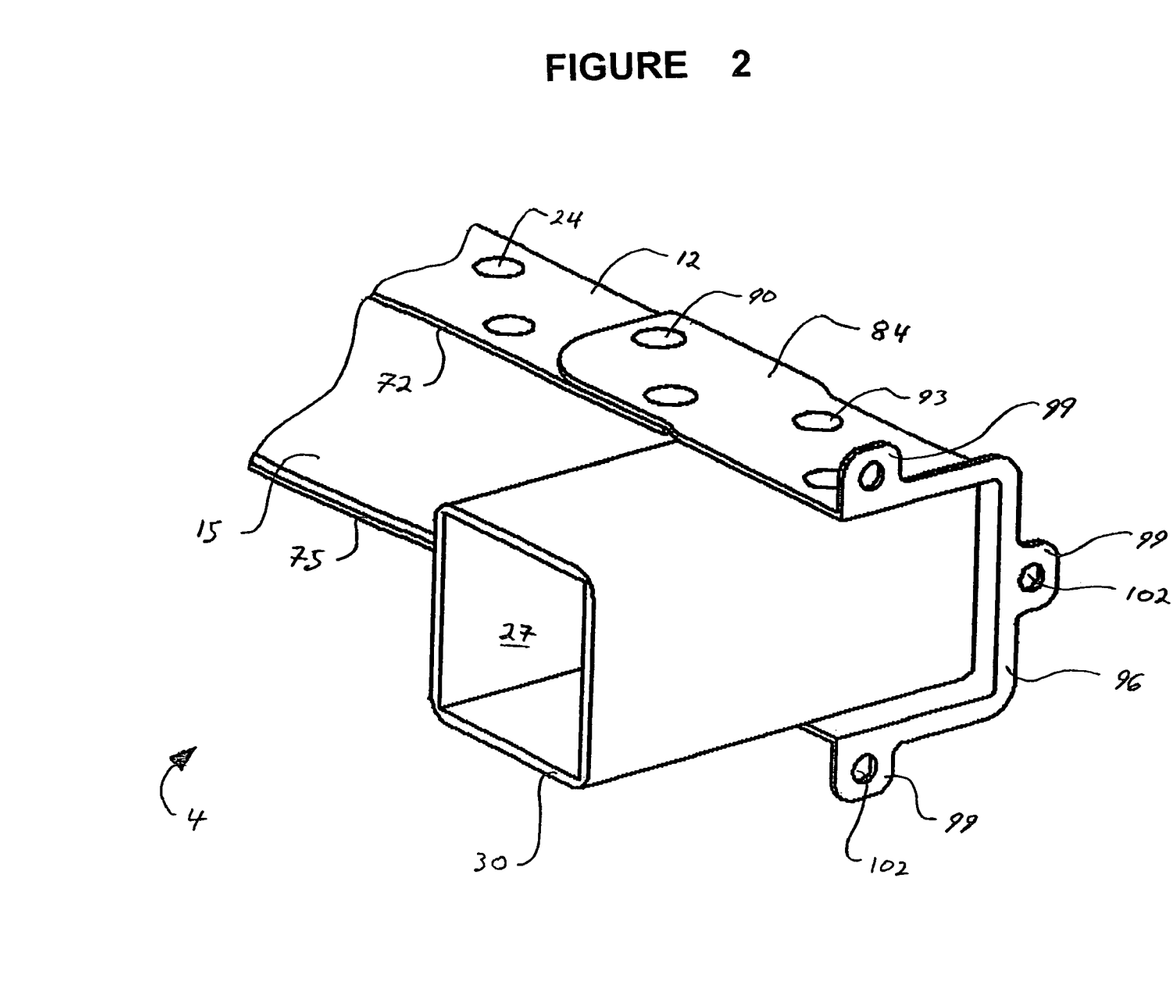
FIG. 2 is a representative perspective view of a portion of the molded cross vehicle beam of FIG. 1, showing attachment element 84 in further detail.

Attachment elements 81 and 84 may each independently be rigid or flexible, e.g., fabricated from a elastomeric thermoplastic material. Preferably, attachment elements 81 and 84 are each rigid. In an embodiment of the present invention (not shown), at least one of attachment elements 81 and 84 is continuous with rigid support 12. With reference to FIG. 2, a portion 4 of cross vehicle beam 3 of FIG. 1 is shown in greater detail with regard to attachment element 84. Attachment element 84 (which is substantially U-shaped) includes a flanged portion 96, which includes tabs 99. Each of tabs 99 includes an aperture 102. Flanged portion 96 and tabs 99 are typically designed and shaped such that attachment element 84 may be attached to a separate support structure, e.g., the door pillar of an automobile (not shown). Attachment element 84 may be fixedly attached to a separate support structure, e.g., a door pillar, by means of aligning apertures 102 of tabs 99 with corresponding holes (e.g., threaded holes) in the support structure, and then passing fasteners, such as screws or bolts, therethrough, as is known to the skilled artisan. Attachment element 81 can be described in a manner similar to that of attachment element 84.

Rigid hollow member (c), e.g., duct 15 of cross vehicle beam 3, is fixedly attached to rigid support (a), e.g., rigid support 12, and attachment element (b), e.g., attachment elements 81 and 84, during the blow molding fabrication of rigid hollow member (c). Rigid support 12 and attachment elements 81 and 84, having a plurality of perforations (not shown in FIG. 1), are placed on one side of the blow mold, each of their second surfaces facing the interior surface of the mold wall, and each of their first surfaces facing the open interior of the mold. A rigid thermoplastic feed material, e.g., in the form of pellets, is extruded, typically in an extruder, and the resulting molten extrudate is passed through a die to form a hollow molten tube, which is referred to as a parison. The parison, which is a precursor of duct 15, is drawn through or into the open mold into which rigid support 12 and attachment elements 81 and 84 have been previously placed. The mold is closed around the parison, pinching off at least one end of the parison. Compressed gas is then fed into the interior of the parison, which expands to fill the interior of the closed mold, abutting at least a portion of the first surfaces of rigid support 12 and attachment elements 81 and 84 therein. A portion of the thermoplastic material of the parison extends through at least some of the perforations of support 12 and attachment elements 81 and 84 to form attachment heads 24 and 93. In addition, a portion of the thermoplastic material of the parison also extends through at least some of the aligned perforations, of the overlap of attachments elements 81 and 84 with rigid support 12, to form attachment heads 90 (as will be discussed further herein). While maintaining the internal pressure within the parison, the expanded parison is allowed to cool and solidify within the mold. The increased gaseous pressure within the molded article is released, and the mold is opened, and cross vehicle beam 3 is removed.

Figure 3:
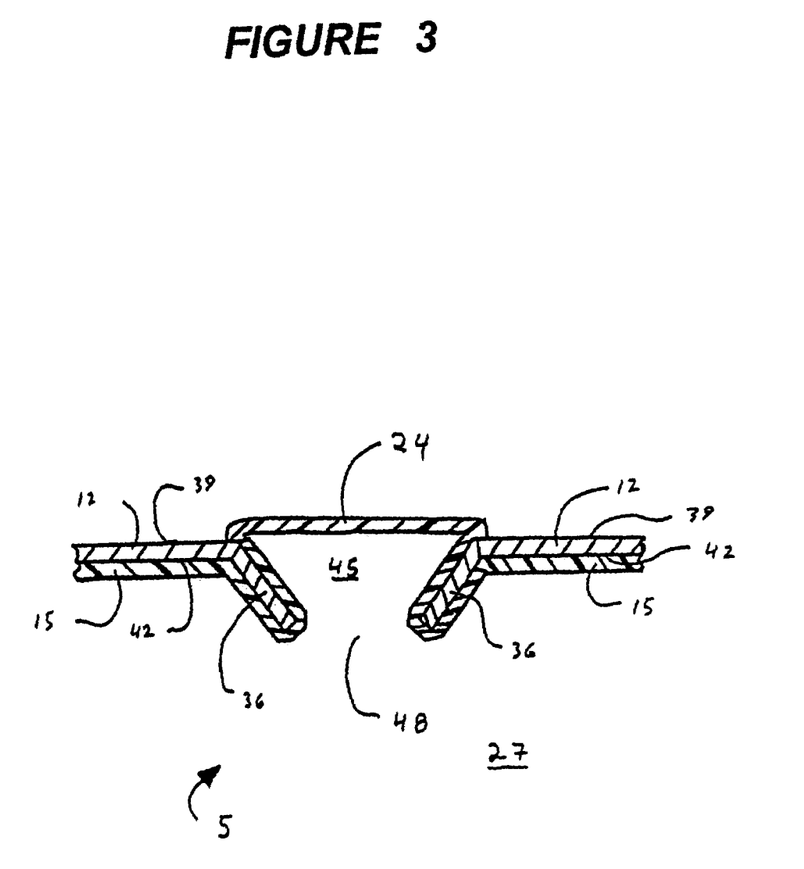
FIG. 3 is a representation of a section of an attachment means through line A—A of FIG. 1.

A sectional representation through line A—A of an attachment head 24 of FIG. 1, is depicted as attachment means 5 in FIG. 3. Rigid support 12 has a perforation 48 therein. Perforation 48 is defined by deformed edge portions 36. A portion of the thermoplastic material of duct 15 abuts against first surface 42 of support 12, and extends through perforation 48 and extends out over a portion of second surface 39 of support 12 to form attachment head 24. The deformed edges 36 of perforation 48 are embedded in the thermoplastic material of duct 15 extending therethrough. Attachment head 24 is typically shaped by means of corresponding indentations in the interior wall of the mold that are aligned with perforations 48.

In FIG. 3, the hollow interior 27 of duct 15 is in communication with the hollow interior 45 of attachment head 24. By selecting perforation 48 of smaller diameter and/or thermoplastic material of duct 15 of greater thickness, the thermoplastic material extending through perforation 48 may fuse together, effectively plugging perforation 48 and forming a substantially solid attachment head 24 (not shown). Alternatively, the hollow interior 45 of attachment head 24 may not be in communication with interior 27 of duct 15, due to plugging (not shown) of perforation 48 by the thermoplastic material extending therethrough.

To assist the extension of portions of the parison through the perforations of the rigid support (a), e.g., perforation 48 of rigid support 12, and attachment element (b), e.g., attachment elements 81 and 84, during the blow molding process, at least one of: (i) increased gaseous pressure is provided on the interior of the thermoplastic parison; and (ii) reduced gaseous pressure is provided on the second surfaces of rigid support (a), for example surface 39 of rigid support 12, and attachment element (b), thereby forcing (e.g., drawing and/or pushing) portions of the thermoplastic parison through at least some of the perforations. In an embodiment of the present invention, the parison is extended through the perforations of rigid support (a) and/or attachment element (b) by the concurrent implementation of methods (i) and (ii).

In addition to attachment heads 24, 90 and 93, duct 15 may be further fixedly attached to rigid support 12 and attachment elements 81 and 84 by attachment means selected independently from fasteners, adhesives and combinations thereof. Examples of fasteners that may be used in the present invention include, but are not limited to, screws, e.g., sheet metal screws, nuts and bolts, and metal rivets. Adhesives that may be used include those that are known to the skilled artisan, e.g., epoxy resin based adhesives.

As used herein and in the claims, the term "adhesives" refers to: (i) adhesive materials (e.g., epoxy resin based adhesives) that are separate from rigid hollow member 15 and each of rigid support 12 and attachment elements 81 and 84; and (ii) cohesive adhesion between rigid hollow member 15 and each of the rigid support 12 and attachment elements 81 and 84. The materials from which each of rigid support 12, attachment elements 81 and 84 and duct 15 are fabricated may be selected such that cohesive adhesion between duct 15 and the other elements results from their mutual abutment. In an embodiment of the present invention, rigid support 12 and attachment elements 81 and 84 are each fabricated from steel, and each are cohesively adhered to duct 15 which is fabricated from DURETHAN thermoplastic polyamide (commercially available from Bayer Corporation.

Figure 4:
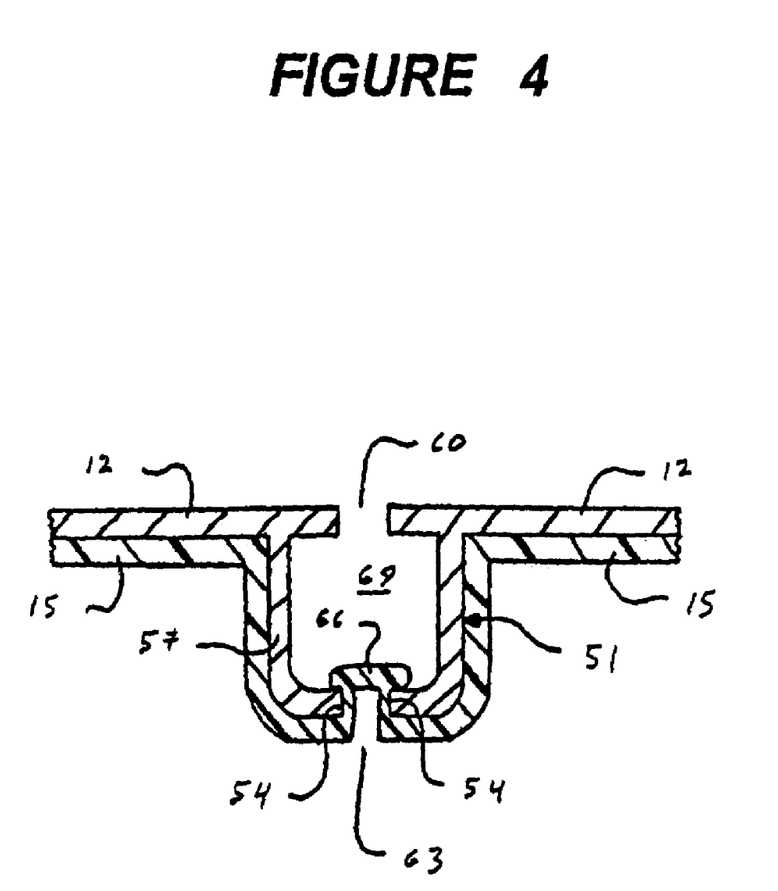
FIG. 4 is a sectional representation of an anchoring extension extending into the molded rigid hollow thermoplastic member of a molded cross vehicle beam according to the present invention.
Figure 5:
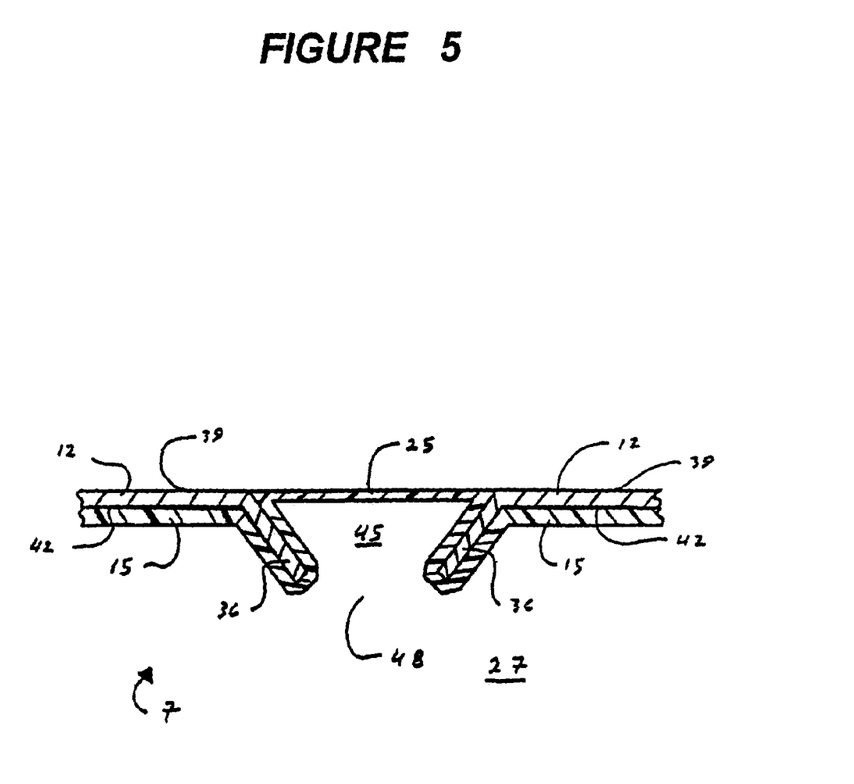
FIG. 5 is a sectional representation of an attachment means similar to that of FIG. 3.

Additional attachment means in accordance with the present invention are depicted in FIGS. 4, 5, 6 and 7. Attachment means 7 of FIG. 5 is similar to attachment means 5 of FIG. 3. Attachment head 25 of attachment means 5, however, is substantially flush with second surface 39 of support 12. The flush attachment head 25 is formed by means of the interior surface of the mold being substantially flush or in abutment with second surface 39 of support 12.

Figure 6:
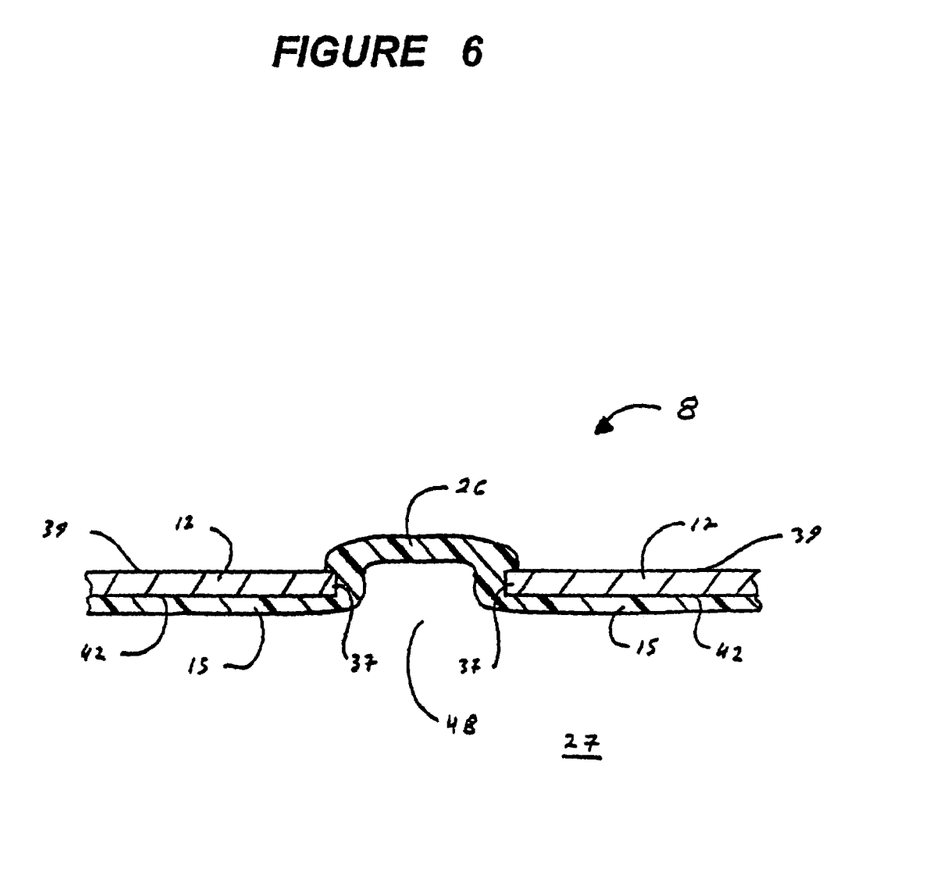
FIG. 6 is a sectional representation of an attachment means similar to that of FIG. 3.

Attachment means 8 of FIG. 6 is similar to attachment means 5 of FIG. 3, however perforation 48 is defined by non-deformed edge portions 37. Non-deformed edge portions 37 of perforation 48 are embedded in the thermoplastic material of duct 15 extending there through, which forms attachment head 26. During the blow molding operation attachment head 26 is shaped by means of abutment with the interior surface of the mold.

Figure 7:
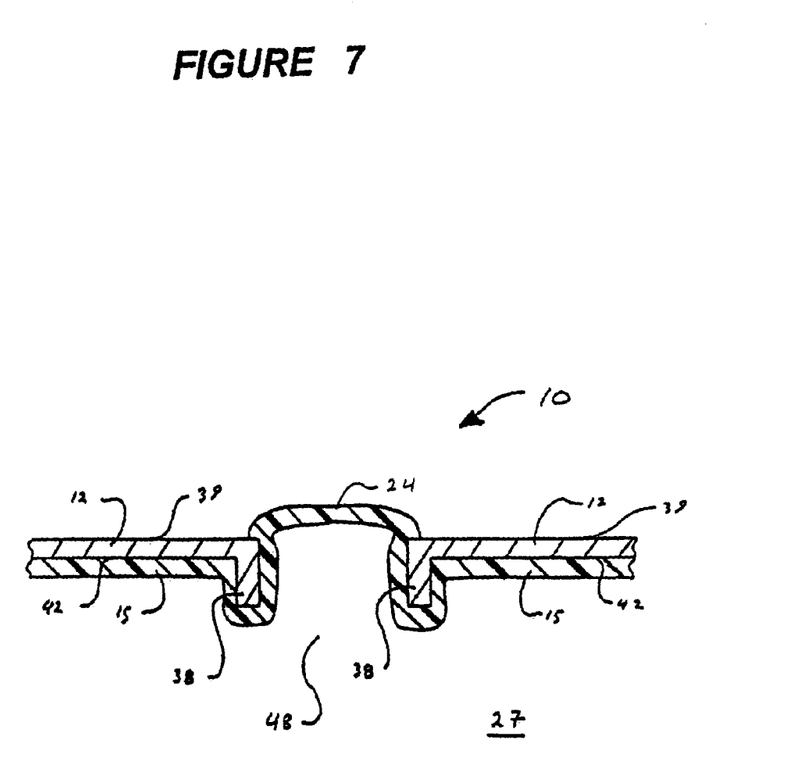
FIG. 7 is a sectional representation of an attachment means similar to that of FIG. 3.

Perforation 48 of attachment means 10 of FIG. 7 is defined by deformed edge portions 38, which have a configuration different than that of deformed edge portions 36 of FIGS. 3 and 5. Relative to second surface 39, the deformed edge portions 36 of FIGS. 3 and 5 tilt in at an angle of less than 90°, while edge portions 38 of FIG. 7 form a substantially 90° angle. Deformed edge portions 38 of FIG. 7 are embedded in the thermoplastic material of duct 15 extending there through, which forms attachment head 23. During the blow molding operation attachment head 23 is shaped by means of abutment with the interior surface of the mold.

Attachment heads 90 and 93 of attachment elements 81 and 84 may be described in a manner similar to that of attachment heads 24, 25 and 26 with reference to FIGS. 3, 5, 6 and 7.

Rigid support (a) and/or attachment element (b) may have extensions, e.g., anchoring extensions, which extend into the thermoplastic material of rigid thermoplastic hollow member (c). Each extension has walls, e.g., side walls, a hollow interior (e.g., a chamber), and at least one perforation in its walls. Portions of rigid thermoplastic hollow member (c) extend through the perforations of the anchoring extensions and into the chamber thereof. In an embodiment of the present invention, all of the perforations of the rigid support (a) and attachment element (b) are located within the walls of the anchoring extensions, and the rigid thermoplastic hollow member (c) is fixedly attached to rigid support (a) and attachment element (b) by means of the anchoring extensions. The anchoring extensions may have any desired shape, but are typically substantially cylindrical.

In FIG. 4, a sectional view of an anchoring extension 51 extending into the thermoplastic material of duct 15 is depicted. Extension 51 has walls 57 and a perforation 63. Perforation 63 has edges 54 which are embedded in the thermoplastic material of duct 15 which extends therethrough. The thermoplastic material of duct 15 extending through perforation 63 forms attachment head 66 within chamber 69 of extension 51. Rigid support 12 has a perforation 60 therein which is in communication with chamber 69 of extension 51. Perforation 60 can be used to form a vacuum within chamber 69, to assist in drawing attachment head 66 therein during blow molding operations. To prevent attachment head 66 from bursting during the blow molding process, a reversibly retractable core pin (not shown) may be extended from the interior wall of the mold through perforation 60 into chamber 69 to provide a limiting surface against which attachment head 66 abuts during its formation, as is known to the skilled artisan. While anchoring extension 51 is depicted as having only one perforation 63 in FIG. 4, it may have a plurality of perforations through which the thermoplastic material of duct 15 extends to form additional attachment heads within chamber 69.

An advantage of using anchoring extensions to fixedly attach duct 15 to rigid support 12 and/or attachment elements 81 and 84 is the recession and accompanying protection that is afforded attachment head 66 within chamber 69. After formation of cross vehicle beam 3, a thermosetting polymer composition, e.g., a two-pack epoxy or polyurethane composition, may be introduced into chamber 69 by means of perforation 60. The introduced thermosetting polymer composition at least partially fills chamber 69 and serves to protect and hold attachment head 66 in place.

Anchoring extension 51 of FIG. 4 may also be used, in addition to attachment elements 81 and 84, to attach the cross vehicle beam assembly 3 to a separate structure, e.g., the A-pillars of an automobile (not shown), in an embodiment of the present invention. This can be achieved, for example, by providing threaded portions (not shown) on the edges of rigid support 12 that define perforation 60, through which a bolt may then be threaded. Alternatively, a threaded nut (not shown) may be affixed over perforation 60, e.g., by means of welding, through which a bolt may then be partially treaded.

Figure 8:
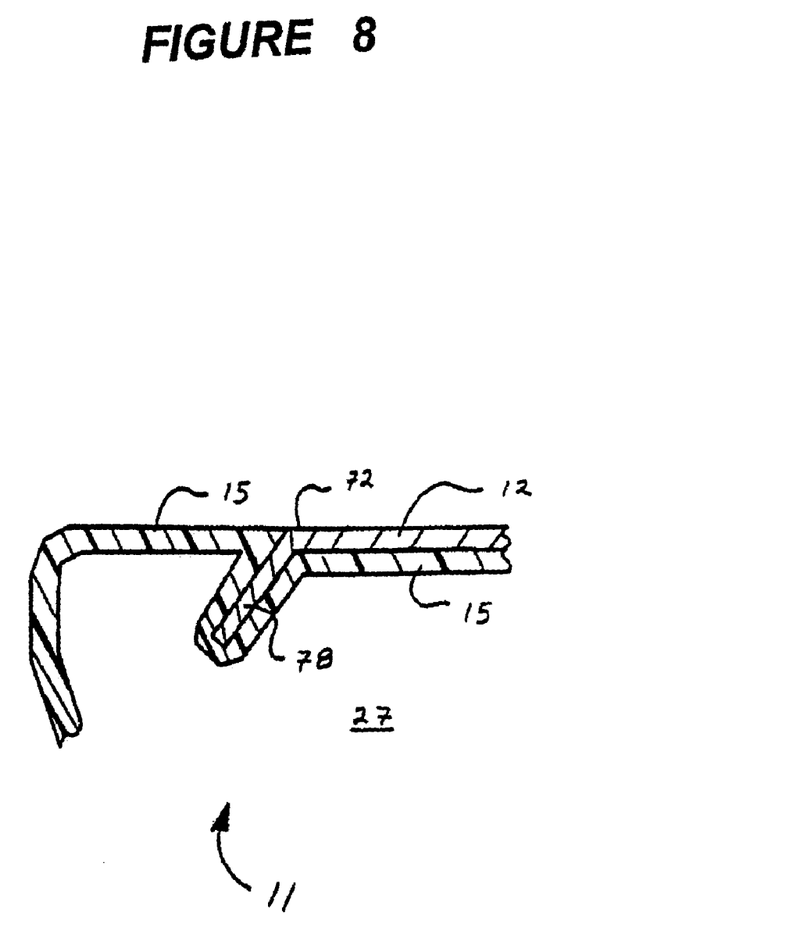
FIG. 8 is a sectional representation of a wrap-around attachment means, in which a portion of rigid hollow member (c) wraps around and embeds at least a portion of the edges of rigid support (a) therein.

In an embodiment of the present invention, rigid support (a) and/or attachment element (b) have edges which are at least partially embedded in portions of rigid hollow member (c) that are wrapped there around (wrap-around attachment means). With reference to FIG. 1, portions of edges 72 and/or 75 of rigid support 12 may be embedded in portions of the thermoplastic material of duct 15. A sectional representation of a wrap-around attachment means 11 is depicted in FIG. 8. With further reference to FIG. 8, edge portion 72 of rigid support 12 has an extension 78 which is embedded in the rigid thermoplastic material of rigid hollow thermoplastic duct 15. Such wrap-around attachment means are preferably formed during the blow molding formation of rigid hollow thermoplastic duct 15. Wrap-around attachment means, such as attachment means 11 of FIG. 8, serve to further fixedly attach rigid hollow member (c) to rigid support (a) of the molded article of the present invention. In another embodiment of the present invention (not shown), extension 78 of wrap-around attachment means 11 is not present, and edge portion 72 is beveled or chamfered (not shown). The beveled edge portion of rigid support (a) is at least partially embedded in portions of the thermoplastic material of rigid hollow member (c) that are wrapped there around.

Figure 9:
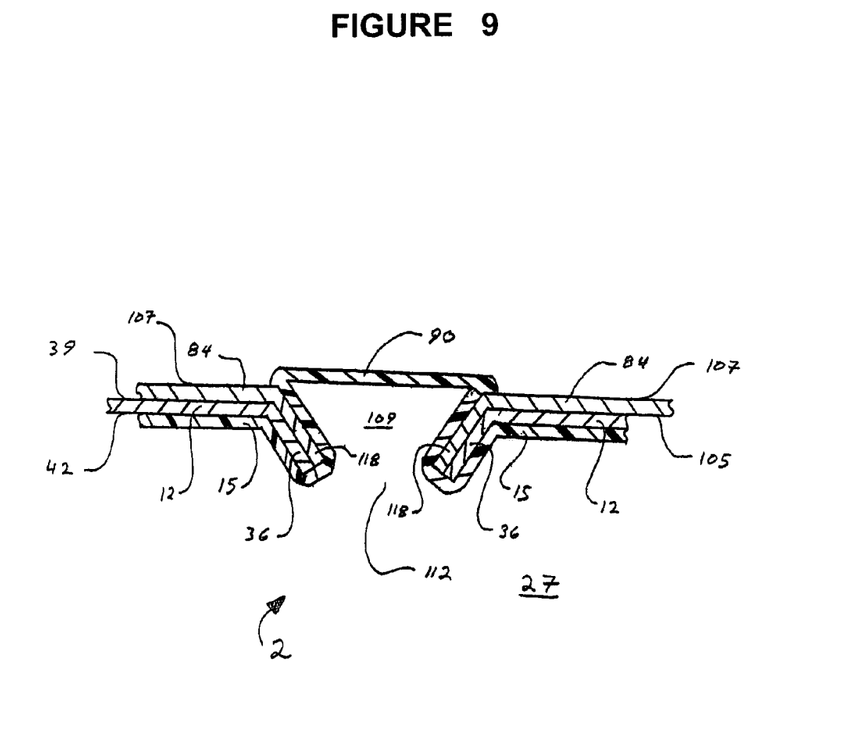
FIG. 9 is a sectional representation of an embodiment of the present invention wherein a portion of attachment element (b) overlaps rigid support (a) and at least some of the respective perforations thereof are aligned.

In an embodiment of the present invention, a portion of attachment element (b) overlaps rigid support (a) (e.g., as depicted in FIGS. 1, 2 and 9) and/or a portion of rigid support (a) overlaps attachment element (b) (not shown). More particularly: (i) a portion of the first surface of attachment element (b) abuts a portion of the second surface of rigid support (a); and/or (ii) a portion of the first surface of rigid support (a) abuts a portion of the second surface of attachment element (b). In each overlapping embodiment (i) and (ii), at least some of the perforations of attachment element (b) and the perforations of rigid support (a) are aligned (the aligned perforations having edges). A portion of the thermoplastic material of the thermoplastic parison extends through at least some of the aligned perforations, embedding the edges of the aligned perforations in the plastic material extending therethrough. As such, rigid molded member (c) is further fixedly attached to rigid support (a) and said attachment element (b).

Attachment means 2 of FIG. 9 is formed by an overlap of attachment element 84 and rigid support 12, and alignment of their respective perforations. See also FIG. 2. More particularly, first surface 105 of attachment element 84 abuts second surface 39 of rigid support 12. At least one perforation of each of attachment element 84 and rigid support 12 are aligned and together define aligned perforation 112. Aligned perforation 112 is defined by the overlapping deformed edge portions 118 and 36 of attachment element 84 and rigid support 12. A portion of the thermoplastic material of duct 15 abuts against first surface 42 of support 12, and extends through aligned perforation 112 and extends out over a portion of second surface 107 of attachment element 84 to form attachment head 90. The overlapped deformed edges 118 and 36 of aligned perforation 112 are embedded in the thermoplastic material of duct 15 extending therethrough. Attachment head 90 is typically shaped by means of corresponding indentations in the interior wall of the mold that are aligned with perforations 48.

In FIG. 9, the hollow interior 27 of duct 15 is in communication with the hollow interior 109 of attachment head 90. By selecting aligned perforation 112 of smaller diameter and/or thermoplastic material of duct 15 of greater thickness, the thermoplastic material extending through aligned perforation 112 may fuse together, effectively plugging aligned perforation 112 and forming a substantially solid attachment head 90 (not shown). Alternatively, the hollow interior 109 of attachment head 90 may not be in communication with interior 27 of duct 15, due to plugging of aligned perforation 112 by the thermoplastic material extending therethrough.

As described previously herein, the extension of a portion of the parison precursor of duct 15 through aligned perforation 112 may be achieved by at least one of: (i) increased gaseous pressure being provided on the interior of the thermoplastic parison; and (ii) reduced gaseous pressure being provided on the second surface 107 of attachment element 84, thereby forcing (e.g., drawing and/or pushing) portions of the thermoplastic parison through at least some of aligned perforations 112. In an embodiment of the present invention, the parison is extended through aligned perforations 112 by the concurrent implementation of methods (i) and (ii).

The configuration of the overlapping edge portions 118 and 36 of aligned perforation 112 may be deformed, as depicted in FIG. 9. Alternatively, overlapping edge portions 118 and 36 of aligned perforation 112 may have other configurations, for example selected from those depicted in FIGS. 6 and 7.

The cross vehicle beams according to the present invention may be used in vehicles including, but not limited to: automobiles; trucks; buses; farm equipment; such as combines; and aircraft. In a preferred embodiment of the present invention, the cross vehicle beam is an automobile cross car beam.

The present invention has been described with reference to specific details of particular embodiments thereof. It is not intended that such details be regarded as limitations upon the scope of the invention except insofar as and to the extent that they are included in the accompanying claims.

What is claimed is:

1. A method of preparing a molded cross vehicle beam comprising a rigid molded hollow thermoplastic member fixedly attached to a rigid support and at least one attachment element, said method comprising:

(I) placing said rigid support and said attachment element in a mold,
   said rigid support having a plurality of perforations having edges, a first surface and a second surface, and
   said attachment element having a plurality of perforations having edges, a first surface and a second surface; and
(II) blow molding a thermoplastic parison precursor of said rigid hollow member against the first surface of said rigid support and the first surface of said attachment element;
wherein a portion of the thermoplastic material of said thermoplastic parison extends through at least some of said perforations of said rigid support and said attachment element, the edges of said perforations being embedded in the plastic material extending therethrough, thereby attaching fixedly said rigid hollow member to said rigid support and to said attachment element.

2. The method of claim 1 wherein during blow molding step (II), at least one of:
   (i) increased gaseous pressure is provided on the interior of said thermoplastic parison; and
   (ii) reduced gaseous pressure is provided on the second surface of at least one of said rigid support and said attachment element,
thereby forcing portions of said thermoplastic parison through at least some of said perforations of said rigid support and said attachment element.

3. The method of claim 1 wherein said rigid support and said attachment element are each independently fabricated from a material selected from metal, thermoset plastic material, thermoplastic material and combinations thereof.

4. The method of claim 3 wherein said rigid support and said attachment element are each fabricated from metal.

5. The method of claim 1 wherein the thermoplastic material of said rigid molded hollow member is selected from at least one of thermoplastic polyolefins, thermoplastic polyvinylchlorine, thermoplastic polyurethanes, thermoplastic polyureas, thermoplastic polyamides, thermoplastic polyesters and thermoplastic polycarbonates.

6. The method of claim 1 wherein the thermoplastic material of said rigid molded hollow member is reinforced with a material selected from glass fibers, carbon fibers, metal fibers, polyamide fibers and mixtures thereof.

7. The method of claim 1 wherein said rigid molded hollow thermoplastic member is further fixedly attached to at least one of said rigid support and said attachment element by attachment means selected from fasteners, adhesives and combinations thereof.

8. The method of claim 1 wherein said rigid support and said attachment element have edges, and said rigid molded hollow member is further fixedly attached to at least one of said rigid support and said attachment element by means of at least one of:
   (i) portions of said rigid molded hollow member wrapping around and embedding at least a portion of the edges of said rigid support; and
   (ii) portions of said rigid molded hollow member wrapping around and embedding at least a portion of the edges of said attachment element.

9. The method of claim 1 wherein said rigid support has a plurality of anchoring extensions extending into said rigid molded hollow member, each of said anchoring extensions having walls, an interior chamber and at least one wall perforation in said walls, each wall perforation having edges, a portion of said rigid molded hollow member extends through at least some of said wall perforations into said chamber, the edges of said wall perforations being embedded in the plastic material extending therethrough, thereby fixedly attaching said rigid molded hollow member to said rigid support.

10. The method of claim 1 wherein said attachment element has a plurality of anchoring extensions extending into said rigid molded hollow member, each of said anchoring extensions having walls, an interior chamber and at least one wall perforation in said walls, each wall perforation having edges, a portion of said rigid molded hollow member extends through at least some of said wall perforations into said chamber, the edges of said wall perforations being embedded in the plastic material extending therethrough, thereby fixedly attaching said rigid molded hollow member to said attachment element.

11. The method of claim 1 wherein said rigid molded hollow member is a continuous unitary molded hollow member.

12. The method of claim 1 wherein said molded cross vehicle beam is an automotive molded cross vehicle beam.

13. The method of claim 11 wherein said rigid molded hollow member is an air duct.

14. The method of claim 1 wherein at least some of said perforations of said rigid support have deformed edge portions, and said deformed edge portions are embedded in the plastic material extending therethrough.

15. The method of claim 1 wherein at least some of said perforations of said attachment element have deformed edge portions, and said deformed edge portions are embedded in the plastic material extending therethrough.

16. The method of claim 1 wherein said attachment element is a rigid attachment element.

17. The method of claim 16 wherein said rigid attachment element (b) is continuous with said rigid support.

* * * * *